July 15, 1941.   G. B. PARKER ET AL   2,249,166
ELECTRICAL PROBE
Filed Sept. 22, 1939
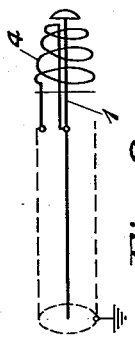
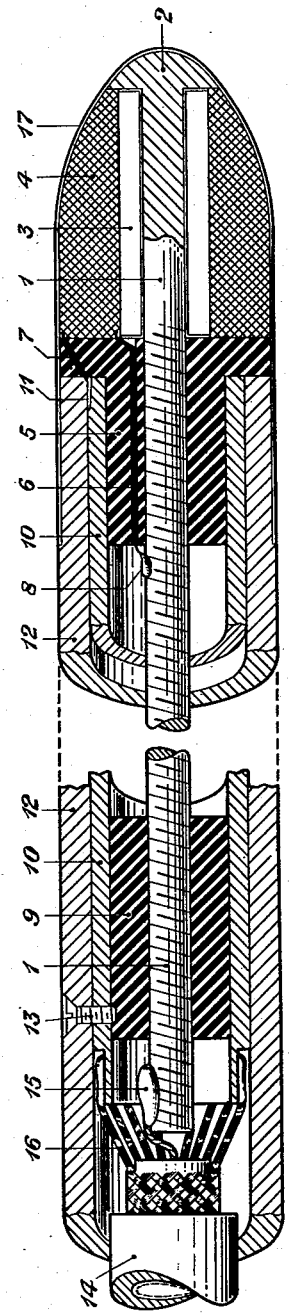
INVENTORS
G. B. Parker, J. P. Meehan and
BY    L. L. Parker
William R. Ballard
ATTORNEY Patented July 15, 1941

2,249,166

UNITED STATES PATENT OFFICE 2,249,166

ELECTRICAL PROBE

George B. Parker, East Orange, Lloyd L. Parker, Ridgewood, and John P. Meehan, Harrington Park, N. J., assignors to American Telephone and Telegraph Company, a corporation of New York Application September 22, 1939, Serial No. 296,150

4 Claims. (Cl. 175—183)

This invention relates to electrical apparatus for picking up current or voltage effects. More particularly, this invention relates to probes or probing devices which are suitable for obtaining an electrical effect from a conductor carrying an alternating current. Still more particularly, this invention relates to probing devices embodying elements both of inductance and capacitance arranged in such a way as to pick up either the voltage effect or the current effect of a conductor carrying an alternating current.

It has been the practice recently to identify the individual wires or conductors of a cable by applying a modulated or unmodulated current to any one of the various conductors to be identified, and identifying the particular conductor to which the modulated or unmodulated current has been applied at a remote point by means of a detector to which a test probe has been connected. The test probe of the prior art comprised a solid metal head that operated merely as a capacity pick-up device. One form of such a test probe is shown and described in a patent granted to D. Fisher et al., No. 2,133,384, issued October 18, 1938.

Because this prior art device was capable of acting merely as a capacity pick-up element, it was found that in general there was considerable difficulty in identifying a conductor (or conductors) at or near voltage nodal points along the conductor. In order to eliminate this difficulty a different type of arrangement has been devised which is effective at voltage nodal points as well as at current nodal points and at points intermediate of these nodes. The difficulties above noted have been eliminated by constructing the probe so as to include an element of inductance as well as an element of capacitance, both so correlated as to be efficient at the frequencies used with the detecting and/or amplifying apparatus employed for making tests for the identification of the many conductors within a single cable. Such an electromagnetic and electrostatic probe has been found to be highly satisfactory in practically all circumstances and it will provide indications of the current or voltage conditions about a conductor at points at which the capacity probe of the prior art could not be used.

This invention will be better understood from the detailed description hereinafter following, when read in connection with the accompanying drawing, in which Figure 1 shows the general assembly of the parts of the inductive and capacitive probe of this invention; Fig. 2 illustrates a schematical representation of the electrical circuit involved in the probe of the invention; and Fig. 3 shows the probe after its complete assembly.

Referring to the drawing and especially to Fig. 1 thereof, reference character 1 designates an elongated threaded cylindrical brass rod which is positioned along the axis of the probe of this invention. The brass rod 1 has a rounded end 2 which forms one extremity of the probe. Mounted about the rounded end 2 of the elongated rod 1 there is a sleeve or core 3 of magnetic material which may be of permalloy or of other suitable magnetic composition. The magnetic sleeve or core 3 is arranged to be coaxial with the elongated brass rod 1. A coil 4 having a great many turns of fine wire is wound about the magnetic sleeve or core 3, the sleeve or core 3 increasing the magnetic field within the coil of wire 4 whenever current traverses the coil. The addition of the magnetic core is, of course, optional in this invention and its use appreciably reduces the number of turns required within the coil of wire 4 to obtain a predetermined electromagnetic field. The coil of wire may be coated with pyroxylin or other good insulating material, as shown at 17, to provide a hard and smooth protective covering about the outer surface of the coil as well as about other parts of the probe, as will be described hereafter. The wire used in the coil 4 may be, for example, No. 35-gauge enameled wire and the coil may comprise 1500 or more turns.

Adjacent to the left-hand end of the coil 4 there is a flanged plug 5 of hard rubber or other equivalent insulating material. The flange of the plug 5 is mounted immediately adjacent the left-hand end of the coil 4. The plug 5 also has two openings therein, designated 6 and 7. One terminal of the coil 4 is drawn through the opening 6 and may be soldered or otherwise connected to the elongated brass rod 1 at the point 8. Another plug 9, which may also be, for example, of hard rubber or an equivalent insulating material, is similarly mounted coaxial with the brass rod 1. This plug 9 is near the left-hand end of the rod 1 and has an outer diameter which is approximately equal to the outer diameter of the non-flanged portion of the plug 5. A cylindrical metal sleeve 10 is positioned about the plug 9 as well as about the non-flanged portion of the plug 5. This sleeve may be made of brass or of other material of good electrical conductivity. The opening 7 in the flange of the plug 5 receives the outer terminal of the coil of wire 4 and this terminal is soldered to the sleeve 10 at the point designated 11. An elongated handle 12 of cylindrical construction is mounted about the metal sleeve 10 and concentric therewith and this handle serves as a means for gripping the probing device just described. The handle 12 may be made of fiber or other material of good insulating properties. It may be fastened to the plug 9 in any well-known manner, as, for example, by a screw 13 which traverses both the handle 12 and a corresponding opening in the metal sleeve 10 as shown in the drawing. The screw 13 need not be of a metallic composition.

A coaxial cable 14 may be employed to connect the terminals of the probing device to a detector and amplifier (not shown). One form of detector and amplifier suitable for use with the probe described is shown and described in the co-pending application of G. B. Parker et al., Serial No. 265,574, filed April 1, 1939. The coaxial cable 14 may be of any flexible construction, as, for example, of the braided type often used with crystal microphones. The center conductor of the cable will be connected to the brass rod 1, as, for example, at the point 15. The braided shield 16, forming part of the cable, will be connected electrically to the metal sleeve 10.

The external coating 17 applied to the coil 4, which, as already explained, may be of pyroxylin, may be applied not only to the outer surface of the coil 4 but also to the outer surface of the rounded end of the brass rod designated 2 as well as over a small portion (or all) of the outer surface of the insulating handle 12, as shown in Fig. 1. The external coating 17 applied to the end 2 of the brass rod 1 may be used, preferably, as a means to insulate the end 2 from conductive contact with all external circuits.

Some idea of the proportions that may be used for certain of the parts forming the probe of this invention may be gauged from the fact that in a number of models of this device already constructed, the rod 1 was made of brass having an outer diameter of .086 inch, the outer diameter of the magnetic sleeve or core was $\frac{1}{8}$ of an inch, the outer diameter of the plug 9 was $\frac{1}{4}$ of an inch, and the outer diameter of the handle 12 was $\frac{7}{16}$ of an inch, the inner diameter of the handle 12 being $\frac{5}{16}$ of an inch. The handle 12, excluding the bullet-shaped end shown in Figs. 1 and 3, was approximately six inches long.

From Fig. 2 it will be observed that one terminal of the coil 4 is connected to the center rod 1 while the other and outer terminal of the coil 4 is connected through the shield terminal to ground. The coil 4 itself comprises the inductive component of the probe while the capacitive component of the probe is formed by a portion of the coil 4 together with the other parts of the probe which are properly proportioned to provide a capacitance of predetermined magnitude.

When the probe described hereinabove is brought into proximity to a conductor carrying a current of a predetermined frequency in the super-audible range, it will pick up some of the current or voltage effects surrounding the conductor. The electromagnetic and electrostatic elements of the probe are coupled together so that the device will respond at current nodal points or at voltage nodal points or at any points intermediate of said nodal points.

The operation of the probing device as an inductive element occurs when current is flowing through the conductor to be investigated and when the turns of the coil 4 are cut by the magnetic flux surrounding the current-carrying conductor. The operation of the device as a capacitive element results from the capacity existing between the conductor being investigated and those parts of the probe nearest said conductor. The capacitive effect of the probe will be dominant when the probe is adjacent to the conductor carrying current at a section at which the current in the conductor is at or near a nodal point. In the latter case there will be substantially no magnetic field cutting the turns of the coil 4.

The inductive and capacitive pick-up properties of the probe are proportioned so that the output from the receiver (not shown) connected to the probe will produce a satisfactory response when exploring along a conductor carrying a current the magnitude of which varies over wide limits. It has been found in practice that the output from the detector or receiver will be of satisfactory volume as the current and voltage effects produced within the conductor vary from conditions corresponding to a short circuit to those corresponding to an open circuit. Thus it will be apparent that the probe of this invention will be substantially equally effective at either current or voltage nodal points as well as at points intermediate of such nodal points. Probes of the prior art do not have properties which in any way simulate those just described.

The inductance of the coil 4 is preferably so proportioned as to resonate at the tracing frequency with the capacity of the leads of the cable 14 connecting the probe device to the detecting device, thus increasing the voltage available in the input terminals of the detecting device.

It will be understood that the brass rod 1 and its tip 2 may be omitted, if so desired, in which case the coil 4 may be supported by a non-metallic rod or by other suitable means. In this case the capacitance between the wire being investigated and the coil winding 4 acts as the capacity pick-up medium.

While the probe illustrated in Figs. 1–3 includes a core of magnetic material, it will also be understood that by a suitable proportioning of the parts of the probe (and/or the apparatus connected thereto), this core may be omitted if so desired.

While this invention has been shown and described in certain particular arrangements merely for the purpose of illustration, it will be evident that the general principles of this invention may be applied to other and widely varied organizations without departing from the spirit of the invention and the scope of the appended claims.

What is claimed is:

1. A device for picking up an alternating voltage or current effect surrounding a conductor contained within a cable, comprising a coil of wire, a holder for said coil of wire, a transmission circuit connected to said coil of wire, said holder including a non-magnetic member providing a capacity with respect to said conductor, the inductance of said coil and the capacity of said transmission circuit being resonant at a frequency substantially equal to that of the voltage or current effect to be picked up.

2. A device for picking up either the electromagnetic or electrostatic fields surrounding a conductor carrying a current of super-audible frequency, comprising an elongated metal member, a coil of wire mounted upon said metal member, the turns of the coils of wire being adjacent one end of said metal member, one end of said coil being connected electrically to the adjacent end of the metal member, a transmission circuit to which the other end of the coil and said elongated member are electrically connected, the inductance of said coil and the capacitance of said transmission circuit being resonant at a frequency substantially equal to that of the current to be picked up.

3. A probe suitable for picking up currents of predetermined super-audible frequencies flowing through a conductor, comprising a coil of wire, a metal core upon which the coil of wire is mounted near one end thereof, one end of said coil of wire being electrically connected to the adjacent end of the metal core, a metal piece coaxial with but insulated from the metal core, the other end of said coil of wire being connected to said metal piece, a layer of insulation surrounding said coil of wire and said metal piece as well as the metal core, whereby current flowing through the conductor to be investigated may be picked up either at voltage or current nodal points or at points intermediate of said nodal points.

4. A probe comprising an elongated metallic member, a core of magnetic material wrapped concentrically about said metallic member at one end of said metallic member, a coil of wire wound about said magnetic core, a metal piece mounted concentric with said metallic member at the distant end thereof but insulated therefrom, one terminal of said coil of wire being connected to said metal piece, the other terminal of said coil of wire being connected to the end of said metallic member adjacent to said coil of wire, whereby the current flowing in a conductor may be picked up at current or voltage nodal points or at points intermediate of said nodal points.

GEORGE B. PARKER.
LLOYD L. PARKER.
JOHN P. MEEHAN.